(12) United States Patent
Sullivan

(10) Patent No.: US 6,393,862 B1
(45) Date of Patent: May 28, 2002

(54) SELF-RETAINING ADSORBENT UNIT

(75) Inventor: Stephen F. Sullivan, Boardman, OH (US)

(73) Assignee: Multisorb Technologies, Inc., Buffalo, NY (US)

( * ) Notice: Subject to any disclaimer, the term of this patent is extended or adjusted under 35 U.S.C. 154(b) by 0 days.

(21) Appl. No.: 09/679,258

(22) Filed: Oct. 4, 2000

(51) Int. Cl.[7] ................................................. F25B 43/04
(52) U.S. Cl. ............................... 62/475; 62/474; 62/503
(58) Field of Search ........................... 62/474, 503, 475

(56) References Cited

U.S. PATENT DOCUMENTS

| 4,619,673 A | 10/1986 | Cullen et al. |
| 4,866,951 A | 9/1989 | Masterson, II |
| 4,911,739 A | 3/1990 | Cullen et al. |
| 4,994,185 A | 2/1991 | Cullen et al. |
| 5,651,266 A * | 7/1997 | Hutchison et al. ............. 62/474 |
| 6,178,772 B1 * | 1/2001 | Incorvia ....................... 62/509 |
| 6,257,015 B1 * | 7/2001 | Incoriva et al. ............... 62/475 |

* cited by examiner

Primary Examiner—William Doerrler
Assistant Examiner—Mark Shulman
(74) Attorney, Agent, or Firm—Joseph P. Gastel

(57) ABSTRACT

An adsorbent unit including first and second porous containers connected by a yoke, adsorbent in the containers, first side edges on the first container containing indentations, second side edges on the second container, an end on the second container having a strap formed thereon for encircling the first container and passing through the indentations when the first and second containers are mounted on opposite sides of a U-bend of a refrigerant accumulator.

23 Claims, 2 Drawing Sheets

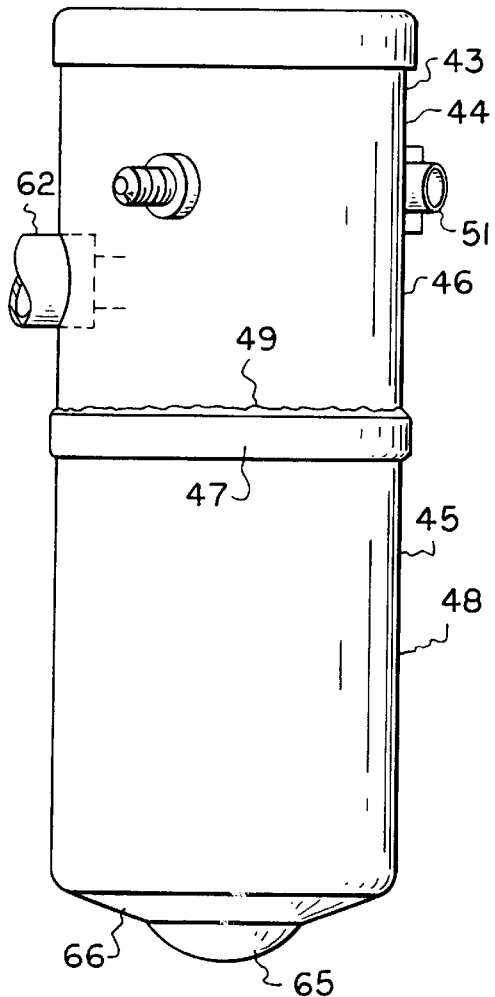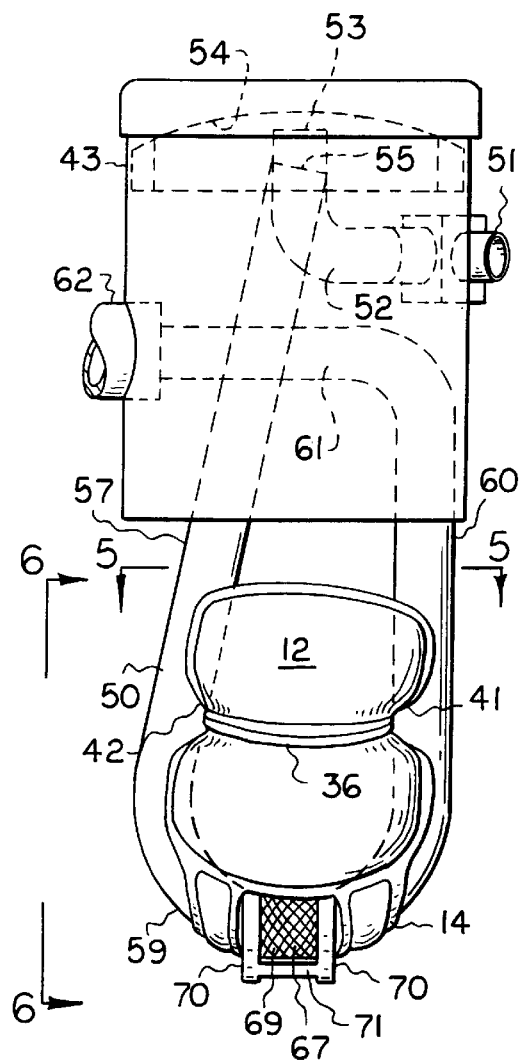
FIG. 3
FIG. 4

SELF-RETAINING ADSORBENT UNIT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to a saddle-type of an adsorbent unit for use in a refrigerant accumulator of an air conditioning system which contains a U-shaped return bend pipe.

By way of background, in many installations a saddle-type of adsorbent unit is utilized in a refrigerant accumulator having a U-shaped return bend pipe for the purpose of adsorbing moisture in the refrigerant. In the past there were numerous ways of securing the saddle-type of adsorbent unit relative to the U-shaped pipe. These ways included tying a band about both adsorbent containers of the saddle-type adsorbent unit and the U-shaped pipe. Another way included mounting the yoke of the saddle-type of adsorbent unit under the U-bend and fastening the outer ends of the individual containers together. An example of this type is shown in U.S. Pat. No. 4,911,739. In another way, a connecting member connected the two containers and the outer ends of the saddle-type of adsorbent unit were mounted on a filter on a U-bend, as shown in U.S. Pat. No. 5,636,525. However, insofar as known, there has been no prior saddle-type of adsorbent unit wherein a strep on one of the containers encircled the other of the containers to maintain the saddle-type of adsorbent unit mounted on a U-bend pipe of a refrigerant accumulator.

BRIEF SUMMARY OF THE INVENTION

It is one object of the present invention to provide an improved saddle-type of adsorbent unit for a U-bend pipe of a refrigerant accumulator in which the mounting structure includes a strap on one of the containers which encircles the other of the containers when the unit is mounted on a U-shaped pipe.

It is another object of the present invention to provide a saddle-type of adsorbent unit as set forth in the preceding object of the invention which can be fabricated in an extremely simple manner and which utilizes only a small portion of the fabric of one container to provide a strap which is used for mounting the adsorbent unit on a U-shaped pipe. Other objects and attendant advantages of the present invention will readily be perceived hereafter.

The present invention relates to an adsorbent unit comprising first and second porous containers, adsorbent in said containers, a yoke connecting said first and second containers, first side edges on said first container, second side edges on said second container, and a strap having ends secured to said second side edges.

The present invention also relates to an improvement in a refrigerant accumulator having a housing with a bottom wall and a side wall and a U-shaped pipe with a return bend adjacent said bottom wall and with first and second pipe portions extending from said return bend within said housing, the improvement comprising first and second adsorbent containers positioned on opposite sides of said first and second pipe portions, a yoke connecting said first and second containers and positioned under said U-bend, first side edges on said first adsorbent container, and a strap on said second container extending about said first container.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 3 is a side elevational view of an accumulator type of receiver in which the adsorbent unit is mounted;

FIG. 4 is a side elevational view of the accumulator of FIG. 3 with the bottom portion removed and the adsorbent unit of the present invention mounted relative to the U-bend pipe therein;

DETAILED DESCRIPTION OF THE INVENTION

Figure 1:
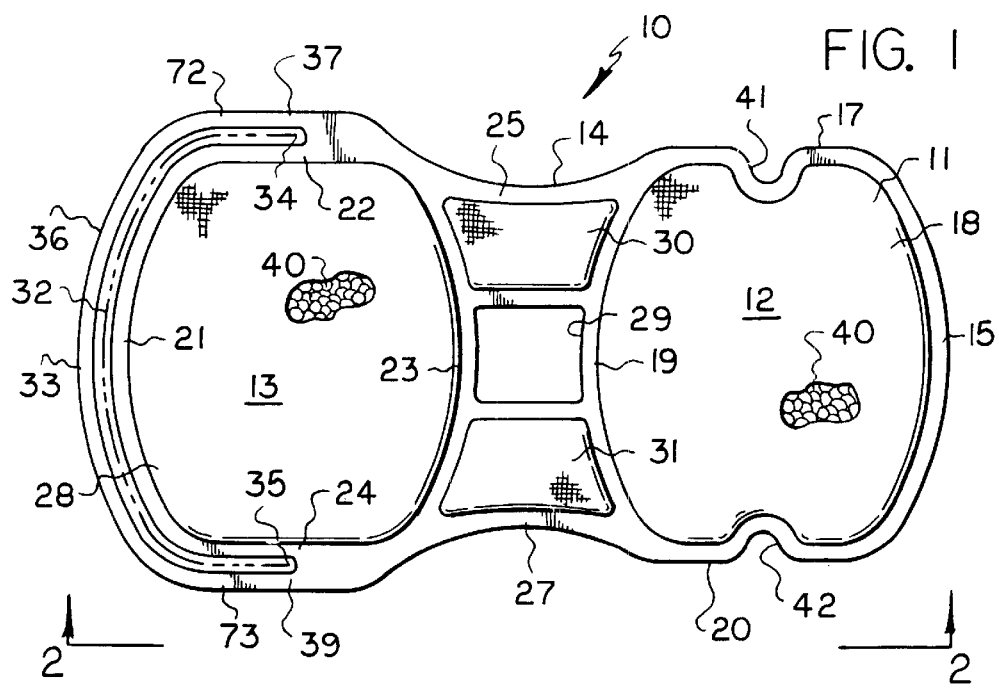
FIG. 1 is a partially broken away plan view of one embodiment of the adsorbent unit of the present invention.
Figure 2:
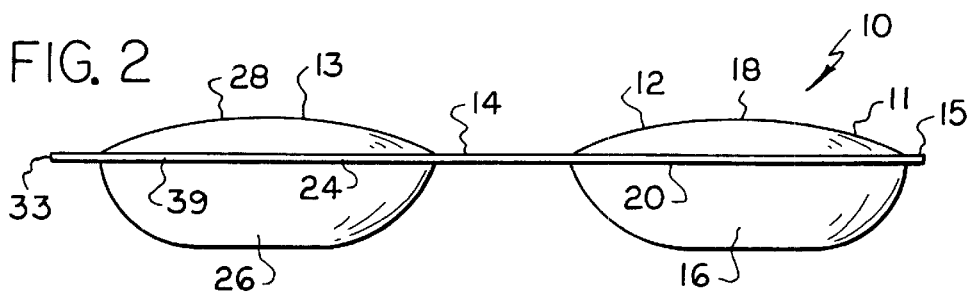
FIG. 2 is a side elevational view taken substantially in the direction of arrows 2—2 of FIG. 1.

The adsorbent unit 10 of the present invention includes a casing 11 formed of porous material, in this instance, heat-fusible felted polyester, but it may be fabricated of any other heat-fusible material. Casing 11 is formed from two sides of felted polyester which are bonded together by fused seams but they can be joined in any suitable manner. Adsorbent unit 10 includes two containers 12 and 13 connected to each other by a yoke 14. Container 12 is bordered by fused seams 15, 17, 19 and 20. Container 13 is bordered by fused seams 21, 22, 23 and 24. Yoke 14 is defined by fused seams 19, 25, 23 and 27. Fused seam 25 has one end which is located at the junction of fused seams 17 and 19 and another end which is located at the junction of fused seams 22 and 23. Fused seam 27 has one end which is located at the junction of fused seams 19 and 20 and the other end which is located at the junction of fused seams 23 and 24. An aperture or opening 29 is located in yoke 14 between yoke portions 30 and 31. A slit 32 is provided, as shown, between fused seam 21 and fused seam 33, and slit 32 terminates at points 34 and 35 in seams 22 and 24, respectively. Thus, fused seam 33 and the adjacent portion of the casing between it and slit 32 is a strap 36 which terminates at points 37 and 39. Concave indentations 41 and 42 are located in fused seams 17 and 20, respectively, which are on the edges of container 12. Containers 12 and 13 contain a preferred grannular adsorbent 40 which is preferably molecular sieve but any suitable adsorbent can be used.

The adsorbent unit 10 is intended to be mounted in a prior art accumulator type of receiver 43 (FIGS. 3 and 4) which includes an upper cylindrical housing portion 44 having a side wall 46 and a lower cylindrical housing portion 45 having a side wall 48 and having a flange 47 which receives the lower edge portion of upper cylindrical housing portion 44 with an interference fit, and a joint is thereafter hermetically welded at 49. Insofar as pertinent here, the accumulator 43 includes a U-bend pipe 50 and a refrigerant inlet 51 which receives a mix of gaseous and liquid refrigerant from the evaporator of a refrigeration system. The refrigerant then passes through pipe 52 having an open end 53 proximate concave surface 54 such that the refrigerant impinges thereon after it leaves pipe 52. The upper end 55 of U-shaped pipe 40 is open, and it receives the gaseous refrigerant which then passes through pipe 57, return bend 59, pipe 60 and pipe 61 to outlet 62 which leads to the compressor, as is well known in the art.

As noted above, the gaseous refrigerant enters U-shaped pipe 40 because it rises to the top portion of the accumulator while the liquid refrigerant from the evaporator drops to the bottom of the accumulator. A lubricant inlet orifice (not shown) is located at the underside of return bend 59 such that the lubricant which accumulates in the depression 65 of bottom wall 66 is induced into the return bend and conveyed with the gaseous refrigerant to the compressor, as is well known in the art. The lubricant passes through a filter 67 which is mounted on U-bend 59. The filter 67 includes a cylindrical screen 69 which surrounds a central portion of the U-bend. The screen 69 is housed in a plastic frame which includes circular end portions 70 connected by a plurality of axially extending ribs, such as 71. A filter of this type is conventional in the art and is shown in more detail in U.S. Pat. No. 4,401,447, which is incorporated herein by reference. In the present instance, pipe 60 is substantially vertical and pipe 57 is inclined. The U-bend 50 is sometimes referred to as a J-bend.

Figures 5, 6:
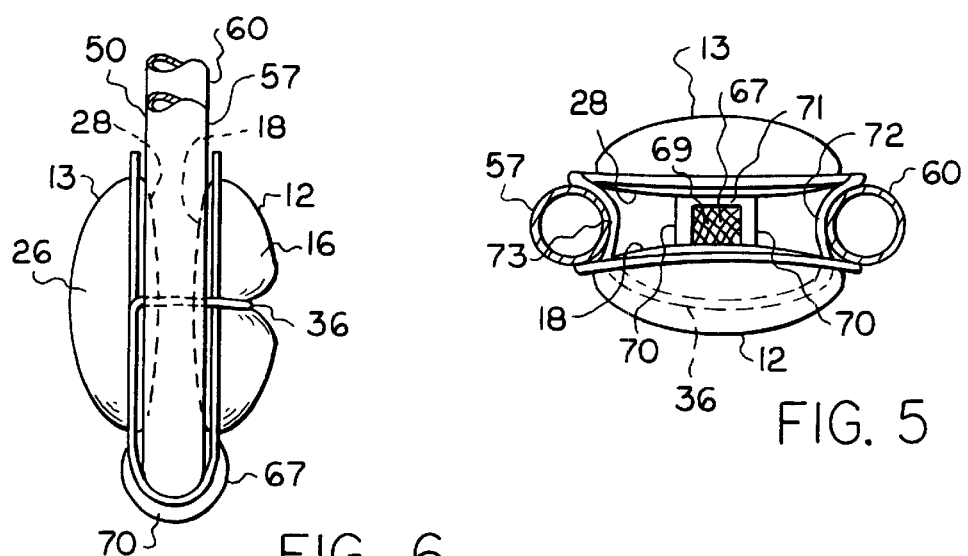
FIG. 5 is a cross sectional view taken substantially along line 5—5 of FIG. 4.
FIG. 6 is a fragmentary side elevational view taken substantially in the direction of arrows 6—6 of FIG. 4.

In FIGS. 4–6 the adsorbent unit 10 is shown in its installed position. In this respect, the yoke 14 straddles return bend 59), and filter 67 including a portion of its plastic frame protrude through aperture 29 of yoke 14. Adsorbent container 12 lies on one side of U-bend 50, and container 13 lies on the opposite side. It is to be noted that container 12 has a pronounced convex side 16 and a less pronounced convex side 18. Container 13 has a pronounced convex side 26 and a less pronounced convex side 28. In its installed position the pronounced convex sides 16 and 26 of containers 12 and 13, respectively, are away from the U-bend pipe 50 and the less pronounced convex sides 18 and 28 face each other. The strap 36 extends between pipes 57 and 60 and encircles the mid portion of container 12 and is received in concave indentations 41 and 42 in the edges of container 12.

It is to be further noted that the concave indentations 41 and 42 are located substantially at the midpoints of fused seams 17 and 20, respectively, and that the ends 37 and 39 of strap 36 are preferably located at substantially the midpoints of fused seams 22 and 24, respectively. This provides for a good stable connection between the containers 12 and 13 in their mounted positions shown in FIGS. 4–6. It can further be seen from FIG. 5 that the end portions 72 and 73 of strap 36 are positioned against pipes 60 and 57, respectively, because of the manner in which the containers 12 and 13, respectively, are dimensioned. The foregoing dimensioning provides a good tight mounting.

If desired, the strap 36 can be made much longer so that it will fit around the outside of pipes 57 and 60 rather than in between them.

While it is preferable to have a concave indentation, such as 41 and 42, in each edge of one of the containers, it will be appreciated that the adsorbent unit can be mounted satisfactorily if there is a concave indentation in only one edge of the containers or if there are no indentations in the edges of one of the containers. In the latter instance the strap 36 could press into the container with sufficient force to hold it in position. Also, if desired, a groove can be formed in the side 16 of container 12 to receive strap 36.

While preferred embodiments of the present invention have been disclosed, it will be appreciated that the pre sent invention is not limited thereto but may be otherwise embodied within the scope of the following claims.

What is claimed is:

1. An adsorbent unit comprising first and second porous containers, adsorbent in said containers, a yoke connecting said first and second containers, first side edges on said first container, second side edges on said second container, and a strap having ends secured to said second side edges.

2. An adsorbent unit as set forth in claim 1 including a concave indentation in at least one of said first side edges for receiving said strap.

3. An adsorbent unit as set forth in claim 1 including indentations in both of said first side edges for receiving said strap.

4. An adsorbent unit as set forth in claim 1 including an aperture in said yoke.

5. An adsorbent unit as set forth in claim 4 including a concave indentation in at least one of said first side edges for receiving said strap.

6. An adsorbent unit as set forth in claim 4 including indentations in both of said first side edges for receiving said strap.

7. An adsorbent unit comprising first and second porous containers, adsorbent in said containers, a yoke connecting said first and second containers, first side edges on said first container, second side edges on said second container, and strap means on said second container for encircling said first container.

8. An adsorbent unit as set forth in claim 7 including a concave indentation in at least one of said first side edges for receiving said strap means.

9. An adsorbent unit as set forth in claim 7 including indentations in both of said first side edges for receiving said strap means.

10. An adsorbent unit as set forth in claim 7 including an aperture in said yoke.

11. An adsorbent unit as set forth in claim 10 including a concave indentation in at least one of said first side edges for receiving said strap means.

12. An adsorbent unit as set forth in claim 10 including indentations in both of said first side edges for receiving said strap means.

13. In a refrigerant accumulator having a housing with a bottom wall and a side wall and a U-shaped pipe with a return bend adjacent said bottom wall and with first and second pipe portions extending from said return bend within said housing, the improvement comprising first and second adsorbent containers positioned on opposite sides of said first and second pipe portions, a yoke connecting said first and second containers and positioned under said U-bend, first side edges on said first adsorbent container, and a strap having end portions formed integrally with said second container and extending about said first container.

14. In a refrigerant accumulator as set forth in claim 13 wherein at least one of said first side edges includes a concave indentation, and wherein said strap is received in said concave indentation.

15. In a refrigerant accumulator as set forth in claim 13 wherein said first side edges include concave indentations, and wherein said strap is received in said concave indentations.

16. In a refrigerant accumulator as set forth in claim 13 wherein said second container has second side edges, and wherein said end portions extend onto said second side edges.

17. In a refrigerant accumulator as set forth in claim 16 wherein at least one of said first side edges includes a concave indentation, and wherein said strap is received in said concave indentation.

18. In a refrigerant accumulator as set forth in claim 16 wherein said first side edges include concave indentations, and wherein said strap is received in said concave indentations.

19. In a refrigerant accumulator as set forth in claim 13 wherein said strap also extends within said first and second pipe portions.

20. In a refrigerant accumulator as set forth in claim 19 wherein at least one of said first side edges includes a concave indentation, and wherein said strap is received in said concave indentation.

21. In a refrigerant accumulator as set forth in claim 20 wherein said second container has second side edges, and wherein said end portions extend onto said second side edges.

22. In a refrigerant accumulator as set forth in claim 19 wherein said first side edges include concave indentations, and wherein said strap is received in said concave indentations.

23. In a refrigerant accumulator as set forth in claim 22 wherein said second container has second side edges, and wherein said end portions extend onto said second side edges.

* * * * *